United States Patent [19]

Gibson

[11] 4,235,482
[45] Nov. 25, 1980

[54] HIGH CAPACITY RUBBER BUSHING

[75] Inventor: Donald L. Gibson, Los Gatos, Calif.
[73] Assignee: FMC Corporation, San Jose, Calif.
[21] Appl. No.: 929,071
[22] Filed: Jul. 28, 1978
[51] Int. Cl.³ .......................... F16C 27/02; F16C 27/06
[52] U.S. Cl. ......................................... 308/26; 308/37; 308/237 R
[58] Field of Search ............... 308/238, 26, 56, 237 R, 308/37; 267/57.1, 153; 16/2

[56] References Cited

U.S. PATENT DOCUMENTS

| 849,200 | 4/1907 | Brinley | 308/56 |
|---|---|---|---|
| 1,778,961 | 10/1930 | Peyinghans | 308/237 R |
| 3,006,627 | 10/1961 | Paulsen | 267/57.1 R |
| 3,425,112 | 2/1969 | Roemer | 308/237 R |
| 3,572,677 | 3/1971 | Damon | 267/57.1 |
| 3,601,459 | 8/1971 | Cutting | 308/26 |
| 4,002,327 | 1/1977 | Damon | 308/238 |

Primary Examiner—Lenard A. Footland
Attorney, Agent, or Firm—R. S. Kelly; H. M. Stanley

[57] ABSTRACT

A bushing is provided which is arranged to be press fit into a bushing bore. The bushing is adapted to support a high level load which is unidirectional or which changes in direction through only a small angle. A rigid core in the bushing has a long rubber, or rubber-like, semicylinder bonded to one side of the outer surface thereof and has a number of uniformly spaced short rubber semicylinders bonded to the other side thereof. The short semicylinders have a greater wall thickness than the long semicylinder so that when the bushing is pressed into the bushing bore the space between the core and the wall of the bore is practically filled on the short semicylinder side. The long semicylinder operates in compression to support the high level load without exceeding the rubber endurance limits and therefore avoids the effects of internal deterioration in the rubber.

10 Claims, 8 Drawing Figures

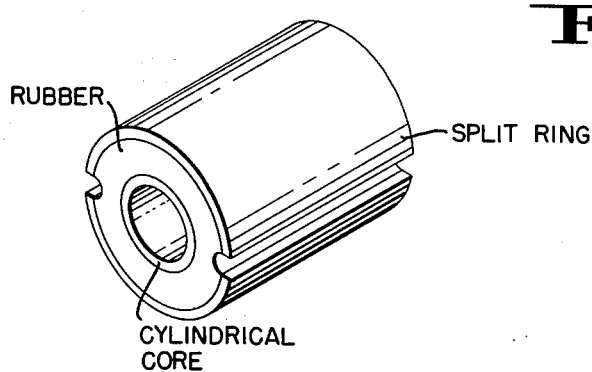
FIG_1A (PRIOR ART)
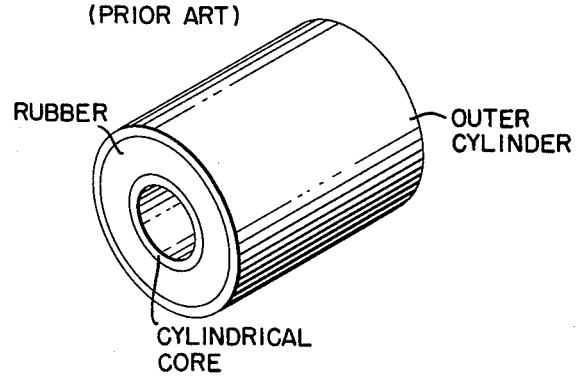
FIG_1B (PRIOR ART)
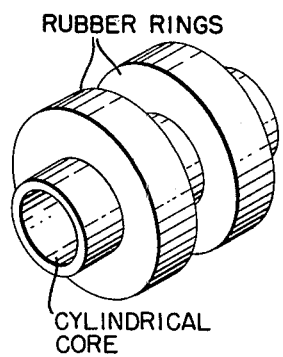
FIG_1C (PRIOR ART)

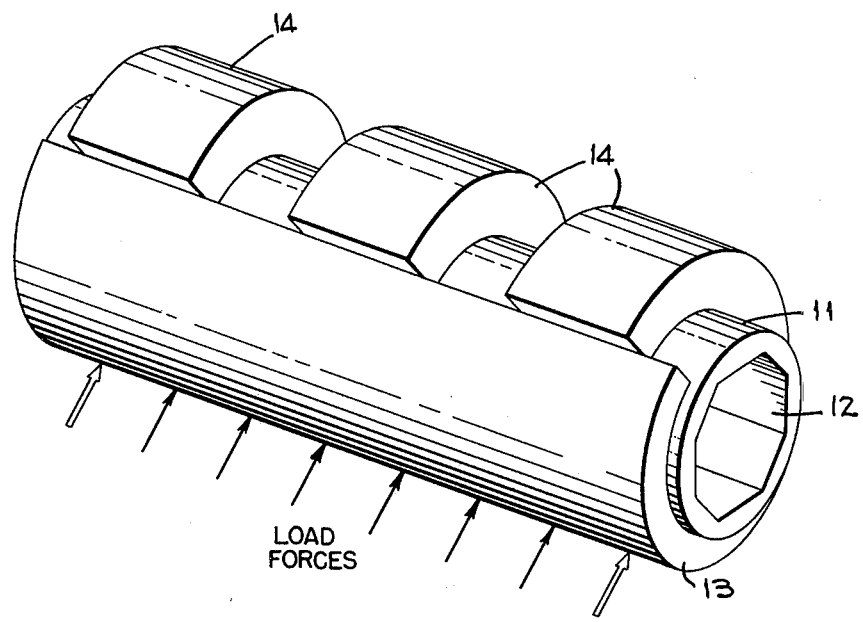
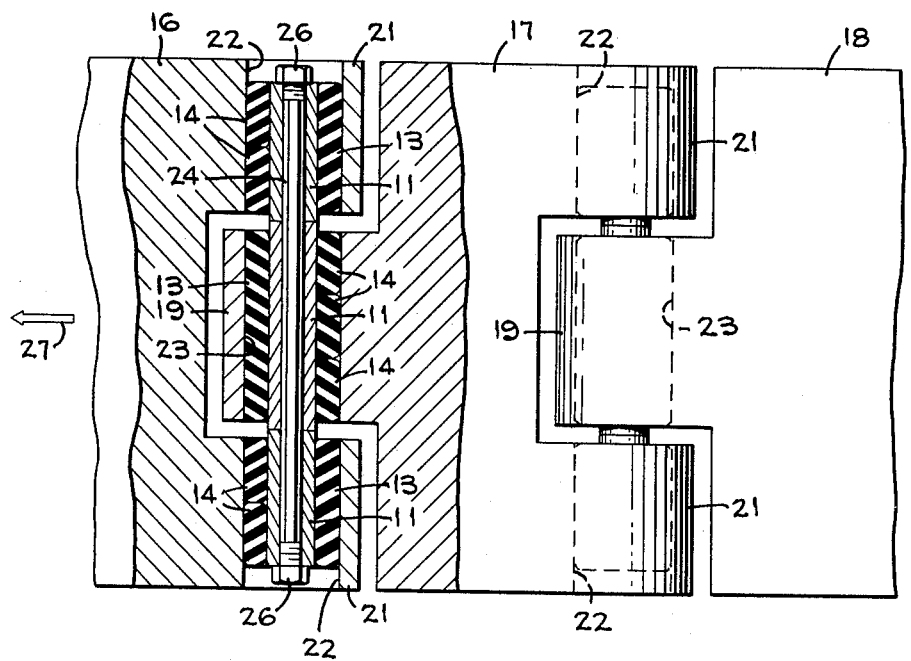

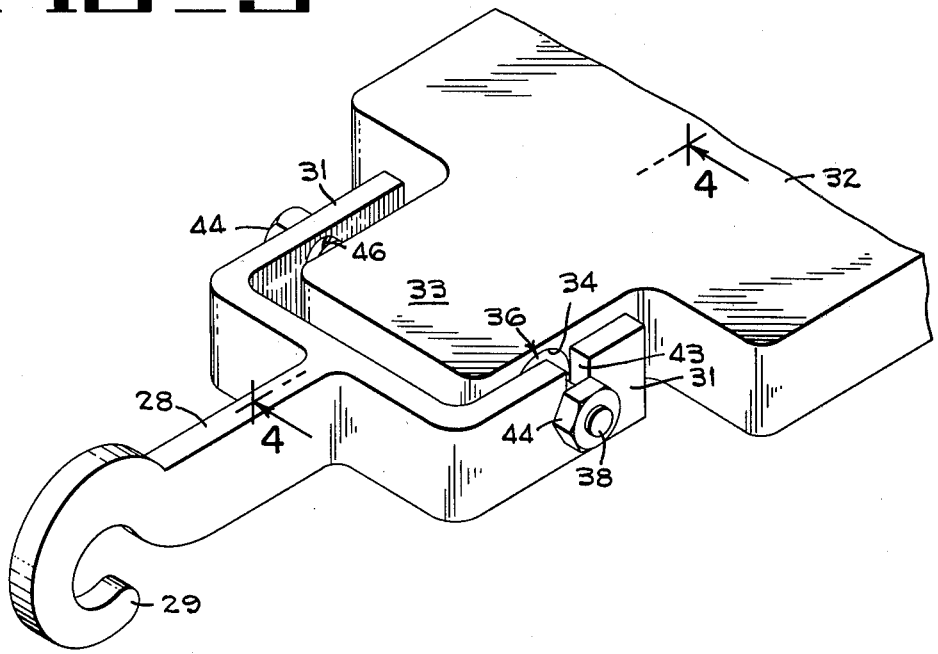
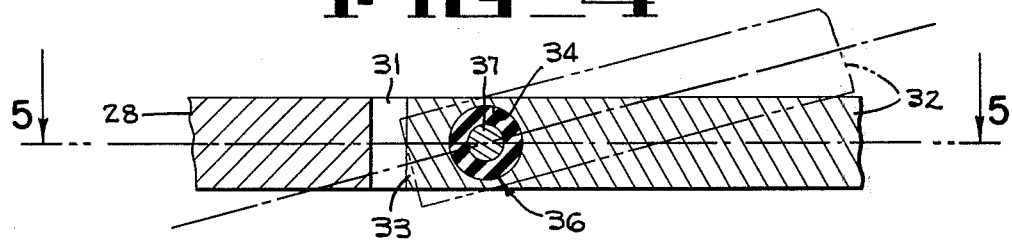
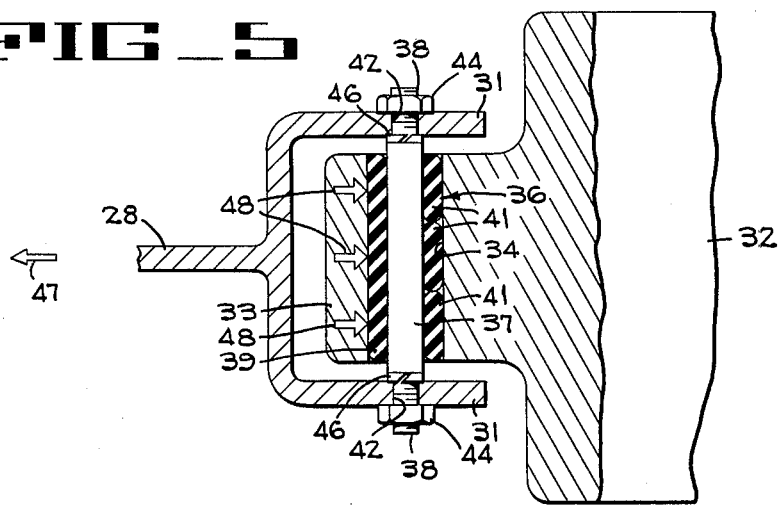

HIGH CAPACITY RUBBER BUSHING

BACKGROUND OF THE INVENTION

1. Field of the Invention

This invention relates to an elastomeric bushing, and more particularly, to such a bushing having a long useful life when subjected to high, substantially unidirectional load levels.

2. Description of the Prior Art

Elastomeric bushings are in widespread use where relative rotational motion is required between a member in contact with the outer surface of the bushing and a member in contact with the inner surface of the bushing. The usefulness of such bushings in supporting a load between the outside and the inside surfaces thereof is a function of the compression strength of the elastomer and the angle of rotation between the outer and inner surfaces together with the speed of the change in such rotational position. An elastomeric bushing is preferable to sliding or roller bearings in many applications because no lubrication is required and inherent isolation from shock and vibration loading is provided.

One such prior art elastomeric bushing is shown in FIG. 1A of the drawings wherein a central hollow cylindrical metal core and an outer split metal ring has a rubber cylinder bonded to the facing surfaces therebetween. However, it has been found that the rubber bushing of FIG. 1A dictates that a severe tolerance be maintained on the dimension defining the bore which receives the elastomeric bushing. Moreover, the assembly process for the bushing of FIG. 1A is relatively expensive since it must include bonding of the elastomer over 100% of the contact area between the split rings and the elastomer as well as over 100% of the contact area between the cylindrical core and the elastomer.

FIG. 1B shows an alternative form of prior art rubber bushing wherein continuous outer and inner cylinders have an elastomeric cylinder positioned therebetween. The type of bushing represented in FIG. 1B typically is not bonded to the outer or the inner metal sleeves but is merely pressed over the inner sleeve and into the outer sleeve at the same time. This type of bushing must generally be retained axially within an accepting bore by some independent structure.

FIG. 1C shows a further prior art rubber bushing which has a hollow metallic inner sleeve and spaced elastomeric rings bonded to the outer surface thereof. The bushing of FIG. 1C is pressed into a receiving bore so that torque applied to the inner sleeve of the bushing induces relative rotational motion between the wall of the bore and the inner sleeve. The capacity for withstanding load without deterioration of the elastomer in the spaced rings is the same in the bushing of FIG. 1C for any radial direction of load applied thereto. The magnitude of the maximum load which may be applied radially to the spaced ring bushing is limited because the bonded area of the surface of the elastomer within which the load energy is dissipated is reduced by virtue of the spaced ring construction. Unbonded surfaces tend to rub and create heat from friction, and also do not support the elastomer at the mating surfaces to prevent high tensile stress from occurring therein.

SUMMARY OF THE INVENTION

The invention disclosed herein relates to a high-load capacity bushing which is formed to be press fit into a bushing bore. A rigid core member has a long elastomeric semicylinder bonded along one side thereof. On the opposite side of the rigid core member at least one short elastomeric semicylinder is bonded which has a radial wall thickness greater than and an axial length less than the radial wall thickness and axial length, respectively, of the long elastomeric semicylinder. When the bushing is inserted into the bushing bore, the short elastomeric semicylinder is compressed therewithin, thereby operating to axially retain the bushing in the bore. The long elastomeric semicylinder operates in compression to support a high level load while remaining within the endurance limit of the elastomeric material.

BRIEF DESCRIPTION OF THE DRAWINGS

FIGS. 1A, 1B and 1C are isometric views of prior art bushings.

FIG. 2 is an isometric view of the high-load capacity bushing of the present invention.

FIG. 3 is an isometric view of two link members coupled by the bushing of the present invention.

FIG. 4 is an enlarged fragmentary section taken along the line 4—4 of FIG. 3.

FIG. 5 is a fragmentary section taken along the line 5—5 of FIG. 4.

FIG. 6 is a plan view, with portions being broken away and shown in section, illustrating a hinged assembly utilizing the bushings of the present invention.

DESCRIPTION OF THE PREFERRED EMBODIMENTS

In FIG. 2 of the drawings one embodiment of the bushing of the present invention is shown and will be seen to differ considerably from the prior art bushings of FIGS. 1A, 1B and 1C. A rigid cylindrical hollow core 11 has an eight-sided inner surface 12. An elastomeric semicylinder 13 is bonded along one side of the outer surface of the cylindrical core 11. A number of shorter elastomeric semicylinders 14 are bonded in uniformly spaced relationship along the opposite side of the outer surface of the cylindrical core 11. The number of short semicylinders 14 will depend upon the radial wall thickness and the spacing therebetween as well as the extent of permissible deformation before the elastomeric material thereof ruptures internally. The elastomer used for both the long semicylinder 11 and the shorter semicylinders 14 is of a substance which dissipates very little energy internally when flexed cyclically. One of the best materials for use in the bushing of this invention is natural rubber.

It should be noted that the radial wall thickness of the long elastomeric semicylinder 13 is not as great as the radial wall thickness of the short elastomeric semicylinders 14. In general, the ratio of the cumulative length of the short semicylinders 14 to the length of the long semicylinder 13 is substantially the same as the ratio of the radial wall thickness of the long semicylinder to the radial wall thickness of each of the short semicylinders. For example, if the wall thickness of the long semicylinder is 60% of the wall thickness of the shorter semicylinders, the cumulative length of the short semicylinders will be approximately 60% of the overall length of the long semicylinder. As mentioned hereinbefore, the number of short semicylinders 14 will depend upon the axial length of the bushing and the capability of the elastomeric material to migrate when deformed without internal rupture.

The capacity of an elastomeric material is defined in this art as the capability of the material to withstand or to support a load without exceeding the endurance limit of the material. In general, as long as the endurance limit of the material is not exceeded there is no damage to the material. The endurance limit is further defined in this art as the capability of an elastomeric material to withstand repetitive force load without material breakdown due to internal energy loss and heat generation.

In FIG. 6 of the drawings one application for the bushing of FIG. 2 is shown. A succession of link members 16, 17 and 18 each have a tongue 19 extending from one end thereof and a pair of spaced projections 21 extending from an opposite end thereof. Aligned bushing bores 22 are shown formed in each of the projections 21 on each of the link members. Another bushing bore 23 is shown formed through the tongue 19 of each of the link members. The bushing bores 22 and 23 are substantially the same diameter. The long elastomeric semicylinder 13 is constructed to be slightly larger in radius than the radii of the bushing bores 22 and 23. The radius of the short semicylinders 14, being greater than the radius of semicylinder 13, is considerably larger than the radii of the bushing bores 22 and 23. Thus, when the bushing of the present invention is pressed into a bushing bore and the elastomeric material is compressed by the bore wall, the short semicylinders are deformed so as to flow axially into the spaces therebetween. Since the radius oversize and the cumulative axial length undersize of the short semicylinders 14 is as hereinbefore stated relative to the elastomeric semicylinder 13, the axial deformation of the short semicylinders 14 is sufficient to substantially fill the spaces between the wall of the bushing bore 22, 23 and the outer surface of the rigid cylindrical core 11. The considerable compression of the short elastomeric semicylinders 14 by the wall of the bushing bore functions to retain the bushing axially within the bushing bore.

When the tongue 19 of one link member 17 of the assembly of FIG. 6 is placed between the projections 21 on the forked end of the adjacent link member 16 so that the bushing bores 22 and 23 are aligned, an elongate rod 24 is passed through the aligned passages through the cylindrical cores 11. The elongate rod 24 is octagonal in cross section, and the eight sided outer surface thereof generally fits within and contacts the eight sided inner surfaces of the cylindrical cores of the aligned bushings. The rod 24 has threaded ends which are engaged by a pair of retaining nuts 26. When the nuts 26 are tightened on the rod 24 against the end surfaces of the cylindrical cores 11, the cores 11 of the adjacent bushings will be forced together in end-to-end relationship. Thus, the rod 24 and all of the cylindrical cores 11 are fastened together to move as a single unit. When the link member 16 is moved rotationally about the axis of the elongate rod 24 the elastomeric material within the long and short semicylinders 13 and 14 is placed in shear as the link member 17 retains its original angular position. The surfaces of the long and short semicylinders which are bonded to the outer surface of the cylindrical core 11 do not move relative to the outer surface of the core and the outer surfaces of the semicylinders do not move relative to the bore with the relative rotational movement between the bore and the core being taken up entirely by the elastomeric material of the bushing. However, the material of the short semicylinders 14 which has been forced to migrate axially in the bore due to the compression fit therein may rub against the outer surface of the cylindrical core 11 during relative motion between the core and the bore. While the surfaces of the migrated elastomer in the short semicylinders may thus undergo some relative movement with respect to the core outer surface and consequently generate some heat due to friction, this will not seriously affect the effectiveness of the bearing since the short semicylinders do not carry the load.

It may be seen in FIG. 6 that with the positioning shown for both the long and short elastomeric semicylinders 13 and 14 in the bushing bores 22 and 23, a force applied to the link member 16 in the direction of the arrow 27 will place each of the long semicylinders 13 in compression. Each long semicylinder is initially compressed only slightly between the bore wall and the rigid core 11 during installation since its compression is not needed to retain the bushing within the bushing bore, and it is thus able to undergo greater loading than would be the case if it were initially under greater compression prior to loading. The long semicylinder thereby operates to support a high level load without exceeding the endurance limits of the elastomeric material. The compression of the elastomeric material necessary to retain the bushing axially within the bushing bore is provided almost entirely by the high compression imposed on the short elastomeric semicylinders 14.

It should be noted that the angle through which one link member 16 may pivot relative to an adjacent link member 17 is in the order of plus or minus 15° in certain applications. This characteristic is a function of applied radial load, the composition of the elastomer and the thickness of the bushing. The bushing hereinbefore described and illustrated in FIG. 2 requires no lubrication during its lifetime. Further, no dirt exclusion structure is necessary, and there is substantially no wear within the bushing material. As added advantages, the bushing of FIG. 2 lacks complexity and therefore may be fabricated at a relatively low cost. Moreover, with reference to FIG. 6, vibration induced in one link member is isolated from an adjacent link member when coupled thereto by the disclosed rubber bushings.

Another embodiment of the bushing of the present invention is useful in the apparatus shown in FIG. 3. A link member 28 has a hook 29 at one end by which the link member 28 may be engaged and a force applied thereto. The link member 28 has a fork at the opposite end defined by tines 31 extending therefrom. A rear link member 32 is shown having a forwardly projecting tongue 33. As seen in FIG. 5 the tongue 33 has a bushing bore 34 extending laterally therethrough. A bushing 36 has a solid elongate cylindrical core 37 with threaded end portions 38. An elastomeric semicylinder 39 is bonded to one side of the solid core 37, and a series of uniformly spaced short semicylinders 41 are bonded to the opposite side of the core 37, as in the previously described bushing of FIG. 2. Also as in the embodiment of FIG. 2, it is preferable that the ratio of the radial wall thickness of the long semicylinder 39 to the radial wall thickness of the short semicylinders 41 be substantially the same as the ratio of the cumulative length of the short semicylinders 41 to the overall length of long semicylinder 39. Thus, while the radius of the long semicylinder 39 is slightly greater than the radius of the bushing bore 34, the radii of the short semicylinders 41 are considerably greater than the radius of the bushing bore. When the bushing 36 is press fit into the bushing bore 34, the short semicylinders 41 are deformed in compression and caused to flow axially into the spaces between the solid core 37 and the walls of the bushing bore 34 so that they substantially fill such spaces.

A through hole 42 (FIG. 5) is formed in each of the tines 31 which holes are aligned with the axis of the bushing bore 34 when the forwardly projecting tongue 33 is inserted between the tines 31. A channel 43 (FIG. 3) may be cut from the edge of one of the tines to the through hole 42 therein to facilitate assembly. Once the bushing 36 is assembled within the bushing bore 34 and the threaded end portions 38 on the solid core 37 are inserted through the holes 42 in the tines 31, nuts 44 are threaded onto the end portions to fix the solid core 37 both rotationally and axially to the tines 31. Lock washers 46 (FIG. 5) may be used to insure proper spacing between the tines 31 and the tongue 33 as well as to insure rotation of the solid core 37 with the link member 28 so that no rubbing occurs therebetween to cause wear of the mating parts.

When a force is applied to the link member 28 in the direction indicated by arrow 47 in FIG. 5, the force is coupled through the bushing 36 to the rear link member 32. As shown in FIG. 5 the long semicylinder 39 of elastomeric material is positioned within the bushing bore 34 so that it is placed in compression by a force having the direction indicated by the arrow 47. The compression of the long semicylinder 39 between the solid elongate core 37 and the wall of the bushing bore 34 is indicated by the reaction force arrows at 48. As described hereinbefore, the larger radius short semicylinders 41, being more compressed initially within the bore than the long semicylinder 39, operate to fix the bushing 36 axially within the bushing bore 34. The long semicylinder 39 can therefore be positioned within the bore 34 under very low initial compression to thereby provide a higher capacity support for the loading condition indicated by the force arrow 47 and the reaction force arrows 48. A high capacity bushing is thereby provided in which the endurance limit of the elastomeric material is not exceeded.

FIG. 4 shows that the rear link member 32 may pivot about the axis of the bushing 36 relative to the link member 28. The rear link member 32 is shown in solid lines aligned with the link member 28 and in dashed lines displaced angularly relative thereto. The pivot angle between the link members 28 and 32 must be held to an angle below that which would cause rupture due to internal stress within the elastomeric material. As mentioned hereinbefore, this permissible angular motion may be approximately plus or minus 15°. Obviously, the relative rotational position of the link members which leaves the bushing in an angularly unstressed condition should be approximately midway between the limits of the permissible relative angular movement of the link members.

A rubber bushing has been disclosed which provides for pivoting motion between adjacent members which are coupled to one another by the bushing. The bushing is capable of withstanding, or supporting, a high level load without exceeding the endurance limits of the elastomer when placed within the bushing bore with the long elastomeric semicylinder portion thereof taking the load in compression.

Although the best modes contemplated for carrying out the present invention have been herein shown and described, it will be apparent that modification and variation may be made without departing from what is regarded to be the subject matter of the invention.

What is claimed is:

1. A bushing for providing a connection which supports a substantially unidirectional force between a pair of tensioned link members one of which has a bushing bore therein, comprising a rigid elongate core, a first elastomeric semicylinder having a predetermined wall thickness and a predetermined axial length bonded on substantially all of the inside surface thereof to one side of said rigid core, at least one additional elastomeric semicylinder having a wall thickness substantially greater than and a cumulative axial length substantially less than said predetermined wall thickness and axial length respectively when in an uncompressed state and being bonded on substantially all of the inside surface thereof to the other side of said rigid core, said first semicylinder and additional semicylinder being sized for a press fit in said bushing bore and assuming a compressed state therein such that the axis of said elongate core is substantially coincident with the axis of the bushing bore, whereby the bushing is retained frictionally within the bushing bore by the compression of said additional elastomeric semicylinder, and said first elastomeric semicylinder may withstand a predetermined radial force load without exceeding the endurance limit of the elastomer.

2. A bushing as in claim 1 wherein said rigid core comprises a solid elongate pin having means for accepting fasteners on each end thereof, said last named means being arranged to be connected to the other of said link members and said elastomeric semicylinders being engaged in the bushing bore in said one of the link members.

3. A bushing as in claim 1 wherein the rigid elongate core comprises a hollow cylinder, an elongate pin disposed to pass through said hollow cylinder and connected to the other of said link members, and means for retaining said hollow cylinder and said elongate pin in fixed rotational relationship.

4. A bushing as in claim 1 including a plurality of said additional elastomeric semicylinders bonded in axially spaced relationship to said other side of said rigid core, the cumulative length of said additional semicylinders being substantially less than the length of said first semicylinder.

5. A bushing used to pivotally couple adjacent links together and to withstand a force load therebetween and wherein one of the links has a bushing bore therein, said bushing comprising a rigid core member, a first elastomeric semicylinder having a predetermined axial length and predetermined radial wall thickness and being bonded at the inside surface thereof along one side of the outer surface of said rigid core member, at least two additional elastomeric semicylinders having a cumulative axial length less than said predetermined axial length and radial wall thicknesses greater than said predetermined radial wall thickness and being axially spaced along and bonded to the opposite side of the outer surface of said rigid core member, said elastomeric semicylinder radial wall thicknesses providing an interference fit with the bushing bore so that when said first and additional elastomeric semicylinders are pressed into the bushing bore with said first semicylinder on the side thereof to be compressed by the force load and said rigid core is coupled to the other of said links, said additional elastomeric semicylinders retain the bushing axially in the bore and said first elastomeric semicylinder accommodates a high force loading.

6. A bushing as in claim 5 wherein the cumulative length of said additional elastomeric semicylinders has substantially the same relationship to the length of said first elastomeric semicylinder as the wall thickness of said first elastomeric semicylinder has to the wall thickness of said additional semicylinders.

7. A bushing as in claim 5 wherein said rigid core member is a hollow cylinder.

8. A bushing as in claim 5 wherein said rigid core member is a solid rod extending axially beyond the ends of said semicylinders, and means for coupling the other of said links to said solid rod on each end thereof, whereby the other of said links when coupled to the ends of said solid rod is free to rotate with said core member relative to the bushing bore.

9. A high load capacity bushing formed to be press fit into a bushing bore comprising a rigid core member, a long elastomeric semicylinder bonded along one side of said rigid core member, and a short elastomeric semicylinder bonded along the other side of said rigid core member and having a radial wall thickness greater than that of said long elastomeric semicylinder, and a length less than that of said long elastomeric semicylinder, said short elastomeric semicylinder being compressed within the bushing bore when pressed therein and operating to axially retain the bushing in the bore and said long elastomeric semicylinder operating to support a high level load without exceeding the endurance limit of the elastomeric material when compressed within the bushing bore.

10. A high load capacity bushing as in claim 9 together with additional short elastomeric semicylinders bonded in axially spaced relationship along the other side of said rigid core member and having radial wall thicknesses and lengths similar to the radial wall thickness and length of said short elastomeric semicylinder, the cumulative length of said short semicylinders having substantially the same ratio to the length of said long semicylinder as the radial wall thickness of said long semicylinder has to the radial wall thickness of the short semicylinders, so that when said semicylinders are pressed into said bushing bore the cumulative length and the wall thickness of said short semicylinders are substantially the same as the length and wall thickness of said long semicylinder.

* * * * *